July 24, 1951     D. S. BRUCE     2,561,781
METHOD FOR MAKING REINFORCED LAMINATED MATERIAL
Filed April 21, 1950

INVENTOR.
DONALD S. BRUCE,
BY *Allen & Allen*
ATTORNEYS.

Patented July 24, 1951

2,561,781

UNITED STATES PATENT OFFICE 2,561,781

METHOD FOR MAKING REINFORCED LAMINATED MATERIAL

Donald S. Bruce, Troy, Ohio, assignor to Gummed Products Company, Troy, Ohio, a corporation of Ohio Application April 21, 1950, Serial No. 157,237

10 Claims. (Cl. 154—93)

My invention has to do with a method and apparatus for making reinforced laminated material, and is particularly adapted to the manufacture of reinforced gummed tape such as is used along the edges of boxboard cartons and the like to form a corner joint.

Reinforced tape of the character herein contemplated comprises generally two webs of tape-forming material secured together and having reinforcing threads or cords extending between the webs at spaced intervals or in continuous serpentine fashion. These threads generally extend laterally of the tape webs and hence span the corners of the carton to which the tape is applied, thereby resisting forces tending to pull apart the walls of the carton.

It is to a simplified and inexpensive mode of manufacturing such tape that the present invention is directed.

In the past it has been the practice in manufacturing reinforced gummed tape to take one of the tape-forming webs, coat one of its surfaces with an adhesive, and then apply reinforcing thread to the coated surface by moving a continuous length of thread back and forth across the coated web as the web moves beneath a reciprocating thread-dispensing device. The reciprocating device places the thread in what amounts to spaced rows extending substantially laterally across the tape web. After the thread has been applied to the web, a second or cover web of tape material is secured to the first web with the threads pressed between the two webs. The longitudinal edges of the laminated webs are then trimmed to remove the loop portions of thread lying between the spaced rows at the edges of the webs. After the trimming, tape gumming is applied to the outer surface of one of the webs, usually the cover web, to complete the manufacturing operation.

The method just described is objectionable in that expensive machinery must be provided to apply the reinforcing thread to the coated web in the proper spaced relationship. The machinery must be operated at a relatively low rate of speed to assure constant and even distribution of the thread on the coated web. The trimming of the tape edges adds an additional step to the manufacturing operation, and in addition provides a substantial amount of waste which increases the production cost of the finished product. It is to the elimination of these objectionable features that the present invention is directed.

According to my invention, reinforced gummed tape is made by applying a non-woven fabric to an adhesively coated base web, the fabric being applied to the web in such fashion that certain threads of the fabric are stripped away leaving others of the threads of the fabric secured to the base web and serving as reinforcements in the finished tape. My procedure is one which may be carried out on an extremely simple machine at a relatively high rate of speed. There is no waste other than the stripped away threads, and these may be easily collected and used for other purposes if so desired. In fact, I have found that the commercial availability of non-woven fabrics of the type suitable for my operation makes the use of such fabrics more economical than the use of a continuous thread applied in the reciprocating manner described.

The above enumerated objects of my invention as well as others which will be apparent to one skilled in the art upon reading this specification, are accomplished by those procedures and arrangement of parts of which I shall now describe certain exemplary embodiments. Reference is made to the accompanying drawings wherein.

Figure 1:
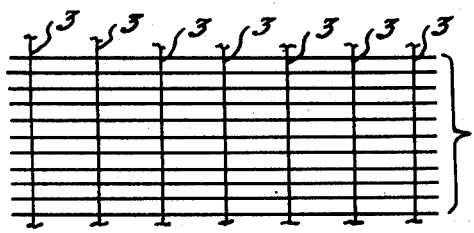
Figure 1 is a plan view of a length of non-woven fabric of the type employed in my invention.
Figure 3:
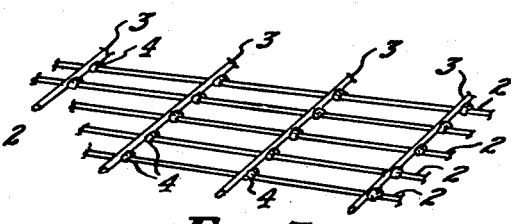
Figure 3 is a perspective view of a length of the non-woven fabric.
Figure 2:
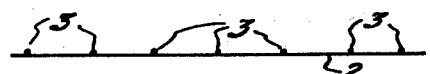
Figure 2 is an elevational view of the length of non-woven fabric shown in Figure 1.

For an understanding of the nature of the non-woven fabric to which I have referred, reference is made to Figures 1, 2 and 3 of the drawings, wherein I have shown a length of non-woven fabric of the type used in the practice of my invention. The fabric web 1 comprises a plurality of spaced substantially parallel woof threads 2 and a plurality of spaced substantially parallel warp threads 3, the latter threads extending at substantially right angles to the former, as is customary in fabric manufacturing. The warp and woof threads are not, however, interwoven in the usual manner, but rather the warp threads 3 overlie the woof threads 2 and are secured to the woof threads by means of asphaltic or other suitable adhesive material 4 applied in this case to the warp threads. The adhesive material binds the warp and woof threads together to form a net-like non-woven fabric.

Non-woven fabric of the character just described is commercially available, a preferred form being Fiberglas non-woven fabric, manufactured by the Owens-Corning Fiberglas Corporation. Fiberglas, which is glass which has been melted and drawn into fine fibres, is particularly suited to the manufacture of reinforced tape since its threads are flexible, light in weight, possess very great tensile strength, and are rot- and mildewproof. The adhesive material which holds the threads together is such that its bond with the threads may be broken by pulling the warp and woof threads apart, and hence the fabric may be separated into parallel rows of threads simply by stripping away the warp or woof threads, as the case may be, while holding on to the threads desired to be retained.

Figure 7:
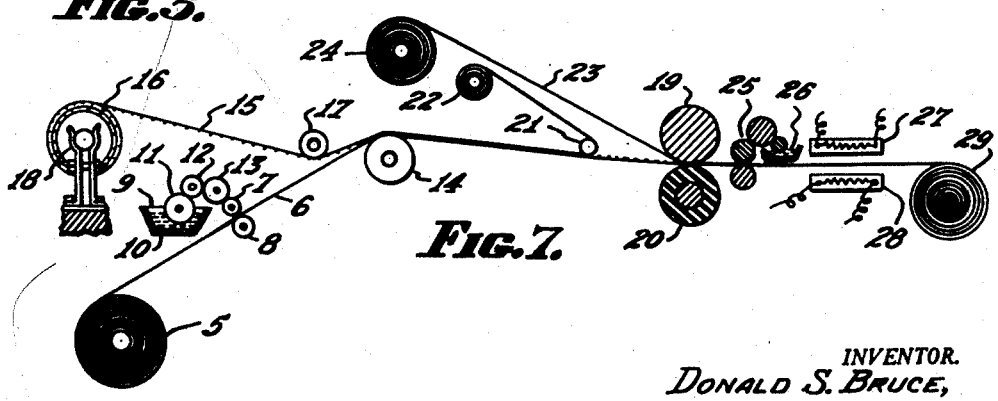
Figure 7 is a diagrammatic representation of apparatus for carrying out my invention.

To better understand how such fabric can be successfully employed in the manufacture of reinforced gummed tape, reference is now made to Figure 7 of the drawings wherein I have illustrated apparatus suitable for carrying out my invention. The reference numeral 5 indicates a supply of tape-forming material, the supply 5 providing the base web 6 of the laminated tape. A kraft paper is generally employed for the base web, although it is not without the spirit of my invention to employ other types of paper and even other tape-forming material such as fabric webbing and the like. If kraft paper is used, it is preferable to employ creped stock so as to provide a crinkled surface into which the reinforcing threads may be pressed, as will be explained more fully hereinafter.

From the supply roll 5 the base web 6 is led between the adhesive-applying roll 7 and the backing roll 8, where adhesive 9 is applied to the upper face of the base web 6, the adhesive being transferred from the glue pot 10 to the adhesive-applying roll 7 by means of the transfer rolls 11, 12 and 13. The adhesive employed is preferably a sticky, laminating adhesive which will remain tacky throughout the laminating operation and may be any one of the large number of asphalt, animal glue or rubber latex types of adhesives which are all well known in the art.

Upon passing the adhesive-applying roll 7, the coated web 6 moves over a combining roll 14 where it is combined with a web of non-woven fabric 15, the fabric being withdrawn from a stock roll 16 and passed beneath a tension roller 17 which cooperates with the combining roll 14 to combine the two webs the adhesive 9 on the base web serving to secure the two webs together. A brake means 18 is preferably employed on the stock roll 16 to control the speed at which the fabric is withdrawn from the roll and hence the tension under which the fabric will be applied to the base web.

The non-woven fabric 15 is wound on the stock roll with the warp threads 3 (referring to the non-woven fabric described in Figures 1, 2 and 3) extending longitudinally of the web and lying uppermost, so that the lateral or woof threads 2 will extend laterally of the base web and come in direct contact with the adhesive 9 on the base web when the two webs are combined.

After the base web 6 and the fabric web 15 are combined, the combined webs are drawn forward toward the pinch rolls 19 and 20. However, before reaching the pinch rolls, the leading ends of the warp threads are stripped back over the roller 21 and wound on the roller 22. The adhesive material which secures the warp threads 3 to the woof threads 2 is such that no difficulty will be encountered in stripping the threads apart, the tenacity of the adhesive 9 on the base web 6 being greater than the bond between the warp and woof threads. The woof threads will be retained by the adhesive and since the warp threads are elevated above the web 6 by the thickness of the woof threads, the adhesive itself will not interfere with the removal of the warp threads.

Immediately following the removal of the warp threads, a cover web 23, also preferably of kraft paper, is fed from a stock roll 24 between the pinch of rolls 19 and 20 where it is combined with the web 6 over the laterally extending woof threads, which are all that remains of the fabric web 15. The pressure of the pinch rolls 19 and 20 will be sufficient to combine the webs, and under the pressure of the pinch rolls, the adhesive applied to the base sheet will also serve to secure the cover web in place. It is not, however, without the spirit of my invention to provide an additional adhesive-applying means to provide a separate coating of adhesive for the cover sheet, should this be necessary.

Figure 4:
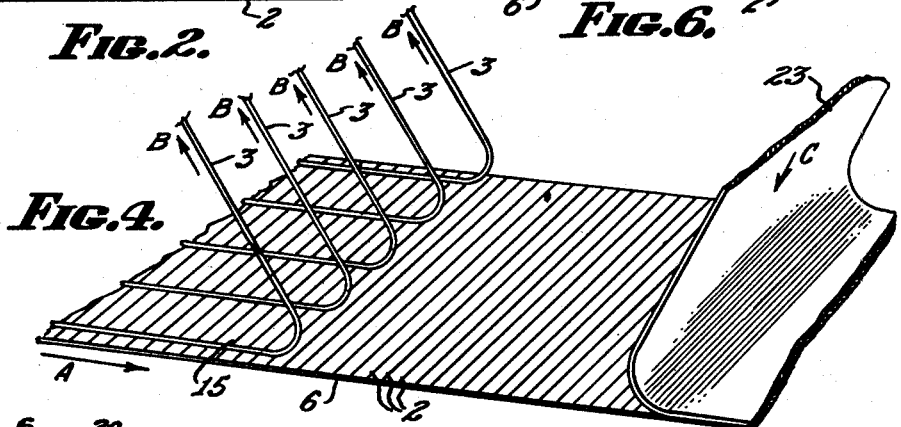
Figure 4 is a perspective view showing non-woven fabric applied to a base web with longitudinally extending threads partially stripped away leaving the laterally extending threads secured to the base web. A second or cover web is shown being applied over the lateral reinforcing threads.

Figure 4 of the drawings shows in perspective and somewhat diagrammatic fashion the operation just described. To the left of the figure, the arrow A indicates the direction of motion of the base sheet 6 and the non-woven fabric 15. The arrow B indicates the direction in which the work threads 3 are stripped away leaving the woof threads 2 embedded in the base sheet 6, and the arrow C indicates the direction of movement of cover web 23 as it is brought down and laminated to the base web 6 over the laterally extending woof threads 2.

I have found it particularly desirable to form the base web 6 of creped material so that the reinforcing threads may be pressed into the creped web thereby avoiding undesirable bulging of the cover web by the reinforcing threads. Undue bulging of the cover web, which is usually the web to which the tape gumming is applied, makes it difficult to obtain a continuous bond between the tape and the carton or the like to which it is applied, the bulges caused by the reinforcing threads interrupting the sealing surface and making adhesion more difficult. By providing a creped base web, the pinch rolls 19 and 20 will drive the reinforcing threads into the base web, thereby avoiding the excessive bumpiness which would be otherwise caused in the cover web by the protruding threads. The reinforcing threads can be driven into the creped web by making the pinch roll 19 which bears against the cover web of steel or other hard material and making the pinch roll 20 which bears against the base web of a relatively soft material such as rubber. The result of doing this will be a comparatively smooth gumming surface on the cover web.

After passing through the pinch rolls 19 and 20, the laminated webs pass beneath a glue roll 25 which applies tape gumming to the uppermost surface of the cover web 23, the tape gumming being indicated at 26. Following this, the webs may be passed between heating elements 27 and 28 which serve to dry both the laminating adhesive and the tape gumming. The finished tape may then be wound on a roll 29 in any desired lengths.

Figure 5:
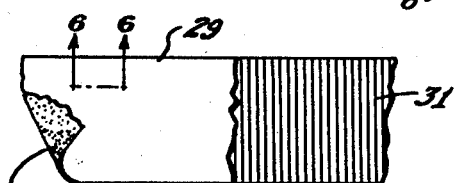
Figure 5 is a plan view of a length of the finished tape with parts broken away to show the reinforcing threads. The folded over portion of the tape illustrates a base web of creped paper.

In Figure 5 I have indicated at 29 a section of completed tape, the turned over portion 30 of the tape illustrating the use of a creped base web.

Figure 6:
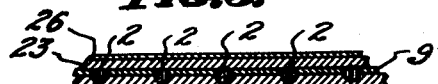
Figure 6 is a sectional view taken along the lines 6—6 of Figure 5.

In Figure 6 I have shown a sectional view taken along the line 6—6 in Figure 5 and illustrating how the reinforcing threads appear when pressed into the base web 6 so as to prevent excessive bumpiness in the cover web 23.

While I have described the application of a cover sheet to the base web over the reinforcing threads, it should be understood that my invention also contemplates the use of a base web and reinforcing threads without the addition of a cover sheet. For example, after the reinforcing threads have been pressed into the base web, a coating of adhesive may be applied directly to the base web over the threads and dried. By doing this, when the adhesive is moistened and the tape applied to a carton or the like, the reinforcing threads will be bonded directly to the walls of the carton. This construction is illustrated at 30 in the right-hand portion of Figure 5. Furthermore, I have found that a satisfactory tape may be produced without pressing the reinforcing thread into the base web. In such case it is desirable, however, to increase the effective thickness of the adhesive or tape gumming to compensate for the thickness of the thread.

Having thus described my invention in certain exemplary embodiments, what I desire to secure by Letters Patent is:

1. A method of making reinforced laminated sheet material which consists in securing a web of non-woven fabric to one face of a web of sheet material, removing all of the threads of said non-woven fabric extending in one direction, and then securing a second web of sheet material to the first noted web of sheet material with the remaining fabric threads extending between the laminations of the combined webs.

2. A method of making laterally reinforced laminated sheet material which comprises securing a web of non-woven fabric to an adhesively coated surface of a web of sheet material, removing the threads of the fabric extending in one direction, and adhesively securing a second web of sheet material to the first web of sheet material with the remaining fabric threads extending across and between the laminations of the combined webs.

3. A method of making reinforced sheet material which consists in securing a web of non-woven fabric to one face of a web of sheet material, and then stripping away the threads of said non-woven fabric extending in one direction so as to leave only the threads of the fabric extending at right angles to the threads stripped away.

4. A method of making reinforced laminated sheet material which consists in securing a web of non-woven fabric having warp and woof threads to the adhesively coated surface of a web of sheet material, the non-woven fabric positioned on the sheet material with its warp threads extending longitudinally of said sheet material and lying uppermost thereon, stripping said longitudinal warp threads from said woof threads whereby to leave only said woof threads secured to said adhesively coated sheet material.

5. A method of making reinforced laminated sheet material which consists in securing a web of non-woven fabric having warp and woof threads to the adhesively coated surface of a web of sheet material, the non-woven fabric positioned on the sheet material with its warp threads extending longitudinally of said sheet material and lying uppermost thereon, stripping said longitudinal warp threads from said woof threads whereby to leave only said woof threads secured to said adhesively coated sheet material, and securing a second web of sheet material to the first web of sheet material over the remaining fabric threads.

6. A method of making reinforced laminated sheet material which consists in securing a web of non-woven fabric having warp and woof threads to the adhesively coated surface of a web of sheet material, the non-woven fabric positioned on the sheet material with its warp threads extending longitudinally of said sheet material and lying uppermost thereon, stripping said longitudinal warp threads from said woof threads whereby to leave only said woof threads secured to said adhesively coated sheet material, and securing a second web of sheet material to the first web of sheet material over the remaining fabric threads, and applying a coating of tape gumming to the outer surface of said second web.

7. A method of making reinforced laminated sheet material which consists in moving a web of sheet material in a path of travel, securing a web of non-woven fabric to said web of sheet material with the longitudinal threads of said fabric away from said web of sheet material, stripping away said longitudinal threads by pulling them in a direction opposed to the direction of movement of the combined webs, and then securing a second web of sheet material to the first noted web with the remaining threads of the fabric extending between the laminations of the combined webs of sheet material.

8. A method of making laterally reinforced laminated sheet material which consists in adhesively securing a web of non-woven glass fabric to the adhesively coated surface of a web of sheet material, removing the lengthwise cords of the web and adhesively securing another web of sheet material in combination with the first noted web of sheet material with the glass fabric strands extending laterally across and between the laminations of the combined webs.

9. A method of making laterally reinforced gummed tape which consists in adhesively securing a web of non-woven glass fabric to the adhesively coated surface of a web of tape-forming material, said non-woven fabric being applied over said web of tape-forming material and with the longitudinally extending threads uppermost, said web of tape-forming material being creped, removing the longitudinally extending threads of the non-woven fabric, and then pressing the remaining threads of said non-woven fabric into said creped web of sheet material.

10. A method of making laterally reinforced gummed tape which consists in adhesively securing a web of non-woven glass fabric to the adhesively coated surface of a creped web of sheet material, the non-woven fabric overlying said web of tape-forming material with its warp threads extending longitudinally of said last-mentioned web, removing the warp threads of the non-woven fabric, adhesively securing a second web of tape-forming material over said first web of tape-forming material with the remaining threads of said non-woven fabric therebetween, and then pressing said remaining threads of said non-woven fabric into said creped web of tape-forming material.

DONALD S. BRUCE.

REFERENCES CITED

The following references are of record in the file of this patent:

UNITED STATES PATENTS

| Number | Name | Date |
|---|---|---|
| 292,572 | Parker | Jan. 29, 1884 |
| 1,270,250 | Schenkelberger | June 18, 1918 |
| 1,323,022 | Crowell et al. | Nov. 25, 1919 |
| 1,544,217 | Castricum | June 30, 1925 |
| 2,293,246 | Fay | Aug. 18, 1942 |
| 2,376,922 | King | May 29, 1945 |